United States Patent [19]

So et al.

[11] Patent Number: 4,671,653
[45] Date of Patent: Jun. 9, 1987

[54] TEST INSTRUMENT FOR AN OPTICAL FIBER

[75] Inventors: Vincent C. So; Richard P. Hughes; Paul J. Vella; Fred A. Huszarik; Renato Mariani, all of Edmonton, Canada

[73] Assignee: Northern Telecom Limited, Montreal, Canada

[21] Appl. No.: 780,149

[22] Filed: Sep. 26, 1985

[51] Int. Cl.[4] .......................................... G01N 21/01
[52] U.S. Cl. ...................................... 356/73.1; 250/227
[58] Field of Search ..................... 250/227; 350/96.15; 356/73.1

[56] References Cited

FOREIGN PATENT DOCUMENTS 0026807 2/1982 Japan ................................. 356/73.1
0058404 4/1984 Japan ................................. 356/73.1

Primary Examiner—Eugene R. LaRoche
Assistant Examiner—James C. Lee
Attorney, Agent, or Firm—Schwartz, Jeffery, Schwaab, Mack, Blumenthal & Evans

[57] ABSTRACT

A battery powered portable test instrument for detecting whether light is propagating in an optical fiber has a jaw into which the fiber is placed, the jaw being closable to press a section of the fiber into a bend having predetermined radius of curvature. If light is propagating through the fiber it is scattered and detected in a detection circuit. If the detected light is greater than the predetermined threshold, an indicator circuit is energized.

14 Claims, 6 Drawing Figures

TEST INSTRUMENT FOR AN OPTICAL FIBER

BACKGROUND OF THE INVENTION

This invention relates to a portable self-contained test instrument for identifying whether an optical fiber is live, that is, whether light is propagating along the fiber.

For repair and branching purposes, telecommunications workers working with fiber optic cables must distinguish between live (i.e. traffic carrying) and spare fibers. The act of identifying a live fiber must not be such as to overly attenuate or distort the propagating signal and nor must the intrusion be such as to operate any diagnostic alarms used to monitor the fiber or cable integrity.

Our co-pending patent application in the name of Brian S. KAWASAKI et al, U.S. Ser. No. 666,266, filed Oct. 29, 1984, entitled FIBER OPTIC COUPLER, describes a device for measuring the light propagating in a fiber by introducing a bend into the fiber and detecting the light emitted at the bend with a photodetector. The photodetector is connected into a level detection circuit which includes a visual read-out means from which the level of light emitted at the bend can be read. The detection device is used in association with a light launching device when effecting a splice or connection between contiguous fibers. Light is directed into one fiber upstream of the splice or connection site using the local launch device and is detected using the local detection device at a location immediately downstream of the site. The two fiber ends are moved relative to one another until the light level measured at the local detection unit is maximized. In order to maximize light input and output at the local launch and detection devices respectively, the radius of curvature at the bend in the local launch and detection devices is made relatively small, of the order of 2.8 millimeters, and the light source and photodetectors in the respective launch and detection devices are constrained to critical positions in relation to the fiber bend since the input and output light respectively is confined to a narrow beam. The arrangement of elements within the local detection unit described in the above-mentioned co-pending patent application in the name of Brian S. KAWASAKI et al, entitled FIBER OPTIC COUPLER does not lend itself to incorporation within a portable and easily usable test instrument for detecting merely the presence or absence of light within an optical fiber. Also, the induced loss in the fiber due to use of the above device is well above the threshold for triggering diagnostic alarms.

A further patent concerned with the emission of light from a bend within an optical fiber is U.S. Pat. No. 4,270,839 (Cross). The intention of the assembly described in this patent is as an optical fiber signal tap. The arrangement depends on positioning the fiber accurately in a pair of light pipes which can be incrementally moved to displace their axes. Initially the fiber extends along the axes of the two light pipes which are positioned contiguously but with ends spaced from one another. Then as one light pipe is moved so that its axis is displaced from the axis of the other light pipe, light is scattered from the small intervening section of fiber and enters the downstream light pipe. Again this arrangement is not adapted to permit rapid testing of live fibers.

SUMMARY OF THE INVENTION

According to one aspect of the invention there is provided a method for detecting whether light is propagating in an optical fiber comprising:
introducing a bend into the fiber to cause any light propagating therein to be scattered from the fiber:
detecting said scattered light;
generating a corresponding electrical output if said detected light is greater than a predetermined threshold level; and
directing said electrical output to an indicator circuit to operate a transducer whereby to indicate to an operator the presence of light in the fiber.

According to another aspect of the invention, there is provided a test instrument for detecting whether light is propagating in an optical fiber comprising:
bending means for introducing a bend into the fiber to cause any light propagating therein to be scattered therefrom;
detection means for detecting scattered light;
generating means for generating a corresponding electrical output if said detected light is greater than a predetermined threshold level; and
an indicator circuit including a transducer energizable by an output from said generating means whereby to indicate to an operator the presence of light in the fiber.

Preferably the bending means includes first and second jaw members, one of the jaw members having a convex body part with "vee" groove to guide the fiber along the center of convex body part, thereby insuring the fiber is positioned for optimum light detection. When said one jaw member moves towards the other jaw member, an optical fiber placed between the jaw members is constrained to adopt the curvature of said convex body part. Said convex body part can be a rod shaped part with a vee groove around its circumference. The other jaw member can be lined with resilient, closed cell foam so as to press the fiber into conformation with the convex part of the first jaw member, without inducing any excess loss in the fiber.

The first jaw member can be spring mounted relative to the second jaw member, the first jaw member being moved against a spring bias to permit a fiber to be positioned within the jaw. The first jaw member, when released, is spring biased towards the second jaw member to constrain said fiber.

The detection means can include a lens to focus light scattered from the bend in the fiber at an avalanche or PIN photodiode. Preferably the cooperating jaw members are symmetrical about an optical axis extending through the lens and through the center of the photodiode. This arrangement results in the device being bidirectional (i.e. detects light propagating in both directions). An alternative arrangement with the detector positioned 90° off axis allows the operator to determine the direction (R to L or L to R) of light propagation. The generating means can include a switch for directing current from batteries mounted within the test instrument to an LED to the indicator circuit. Suitable transducers are light emitting diodes (LEDs) and a tone generator. The switch may be of the momentary contact type. Pressing the switch button illuminates either a green LED, indicating light propagation, or a red LED indicating no light and sufficient battery power.

The test instrument preferably has a barrel portion and a cap portion, the first jaw member being present within the cap portion and the second jaw member, the detection means, the generating means and the indicator circuit being mounted within the barrel portion. The barrel portion can have a compartment for the power source, a separate compartment for electronic components forming the generating means and the indicator circuit, and a third compartment being encompassed by said cap portion and containing the detection means and said second jaw member.

An embodiment of the invention will now be described by way of example with reference to the accompanying drawings in which:

DESCRIPTION OF THE PREFERRED EMBODIMENTS

Figure 1:
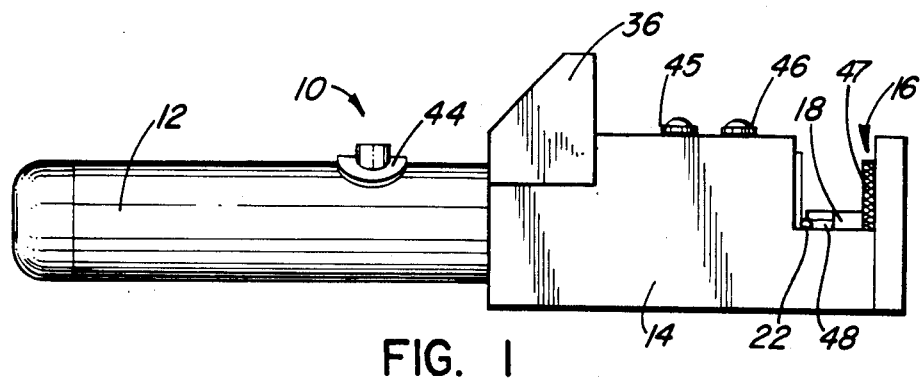
FIG. 1 is a side elevation of a test instrument according to the invention, the instrument being shown with jaws open.
Figure 2:
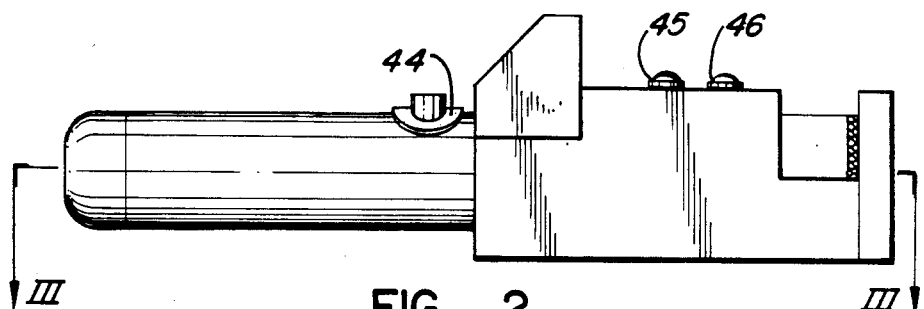
FIG. 2 is a side elevation of the instrument with the jaws closed.
Figure 3:
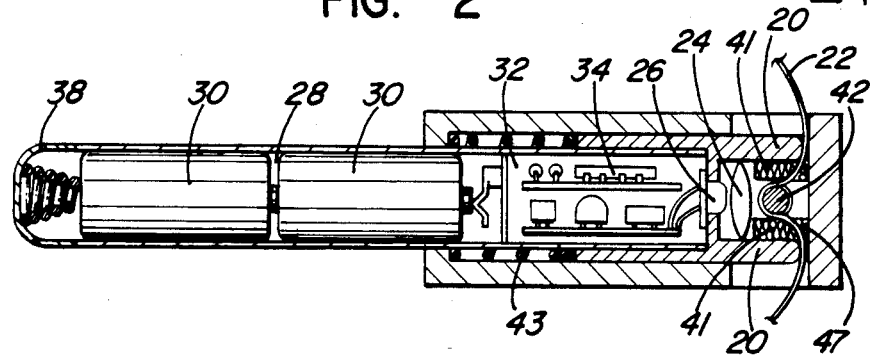
FIG. 3 is a longitudinal sectional view on line III—111 of FIG. 2.

Referring to the FIGS. 1-3 in detail, the test instrument 10 has a barrel 12 and a cap 14. The cap 14 has an aperture 16 extending partially around its perimeter and spaced from the end of the cap. The cap end is formed with a rib 18 facing towards the barrel 12. Fixed within a recess at the end of the rib is a cylinder 42 with a vee groove 48 about its circumference. At the cap end, the barrel has relatively thick wall portions 20 which have convex outer edges, the inside of these wall portions being lined with a resilient closed cell foam 41. The cap is spring mounted by means of a spring 43 cooperating with abutments to bias the cap towards the barrel. The spring mounting permits movement of the cap 14 away from the barrel 12 to allow insertion of a fiber 22 between the cylinder 42 and the foam 41 so that the cylinder and the foam Portions 41 meet and function as a pair of cooperating jaws to clamp the fiber 22. Spaced from the cylinder 42 is a lens 24 positioned to focus any light scattered from a curved section of the fiber at a Photodetector 26.

Within the barrel 12 are two compartments, the left-hand compartment 28 serving to house a battery power source 30 and the right-hand compartment 32 housing electronic circuitry 34 including a threshold detector for assessing whether light detected by photodetector 26 is above a predetermined threshold level, and an indicator circuit which is energized if the detected light exceeds that threshold.

Figure 4:
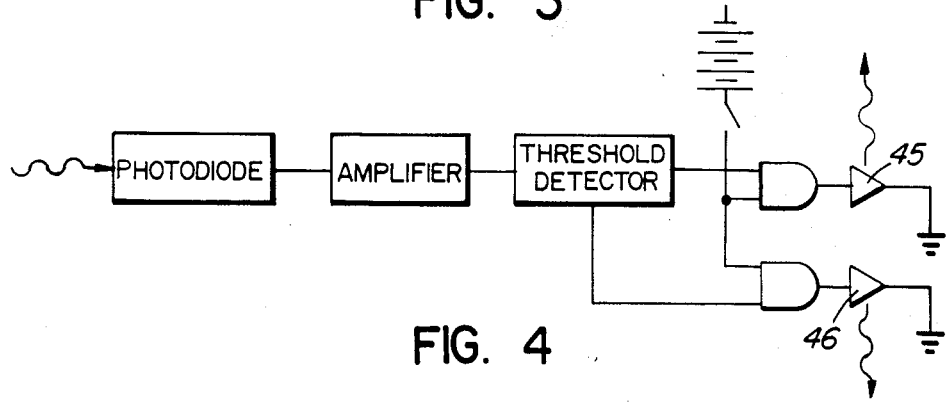
FIG. 4 shows a light detection and indicator circuit used in the test instrument of FIG. 1.

In use, the cap 14 is moved against the spring bias to open up the aperture 16 between the cylinder 42 and the facing wall parts 20 and the fiber 22 is threaded through the instrument. The cap 18 is then carefully released and the spring bias moves the cap so that the cylinder 42 presses the fiber 22 against the foam 41 lining wall portions 20 so that the fiber adopts the curvature of the cylinder 42. Closed cell foam 47 on the cap part serves both to clamp the fiber and to shield it and the detector 26 from ambient light. If the fiber 22 is transmitting light, a certain amount of light is scattered and is focussed by the converging lens 24 onto the detector 26. When holding a switch button 44, and if the detected light is above the threshold level, the indicator circuit of FIG. 4 is energized and a green LED 45 is illuminated. If the fiber is not carrying light, the energized circuit causes a red LED 46 to illuminate, indicating sufficient battery power but no light scattered from the fiber.

The instrument is held in one hand with the barrel part 28 in the palm of the hand and the cap is moved against spring bias by thumb pressure on a projection 36. The fiber 22 is let into the aperture 16 using the other hand. The batteries 30 are replaced when necessary in a normal flashlight manner by unscrewing a cap 38 at the remote end of the barrel and sliding the batteries from the barrel 12.

The curvature of the fiber extending around the rib 18 is important. If the radius of curvature of the rib is too small, then untenable loss may result in the transmitted signal resulting in system alarms. On the other hand, if the radius of curvature is too large, then little light will be scattered from the fiber and it is impossible to judge whether the fiber is live. For conventional monomode fibers having a doped silica core and pure silica cladding together with an acrylate coating a suitable rod radius of curvature is approximately 8 millimeters.

Figure 5:
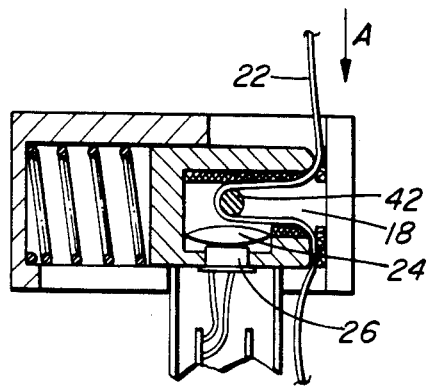
FIG. 5 shows a detail of the FIG. 3 sectional view showing the jaw members and monitoring optics in an alternative disposition.

Referring to FIG. 5 an alternative arrangement of the cap end is shown in which lens 24 and photodiode 26 are mounted asymmetrically of the curved fiber. Unlike the previous embodiment FIG. 5 shows part of an instrument which can be used only for detecting light propagating unidirectionally along the fiber in the direction of arrow A.

Figure 6:
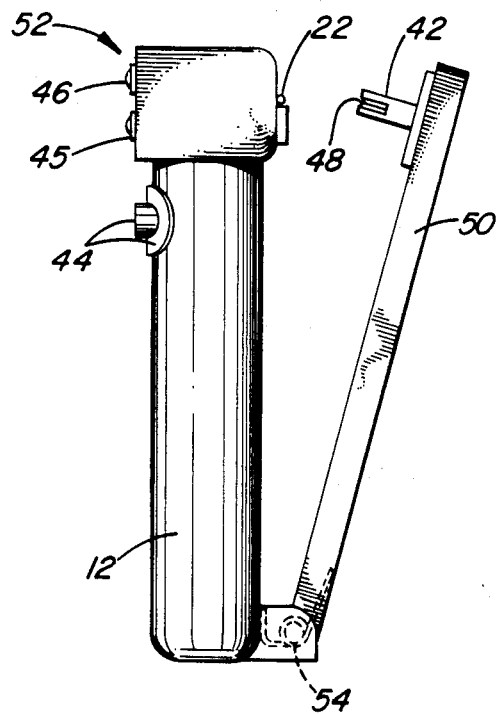
FIG. 6 is a side elevation of an alternative test instrument in which cooperating jaw members are mounted together using a torsion spring.

Referring to FIG. 6, the arrangement of the jaw members is different from that shown in FIGS. 1 to 5. Here the rod 42 with fiber seating "vee" groove 48 is mounted on a first jaw member 50 corresponding to the cap 14 and the other jaw member 52 is mounted on the barrel portion 12 in an orientation different from that shown in FIG. 1. The jaw members 50, 52 are hinged at an axis at which a torsion spring 54 is located to urge the jaw members 50, 52 together. The jaw members are forced apart about the axis to let in the test fiber 22 and then are released to allow the test to be made. In other respects, the arrangement resembles that of FIG. 1.

What is claimed is:

1. A test instrument for detecting whether light is propagating in an optical fiber comprising: p1 a first housing having an aperture for accepting a portion of an optical fiber within said first housing;

a second housing slidably mounted at least partially within said first housing and having an aperture for accepting said portion of the optical fiber, wherein said first housing cooperates with said second housing for introducing a bend into the fiber to cause any light propagating therin to be scattered therefrom;

means, mounted within said second housing, for supplying power to the test instrument;

means, mounted within said second housing, for detecting the scattered light;

means, mounted within said second housing, for generating a corresponding electrical output if said detected light is greater than a predetermined threshold level; and an indicator circuit mounted within said second housing including a transducer energizable by an output from said generating means for positively indicating to an operator the presence or absence of light in the fiber so that the test instrument is self-contained.

2. A test instrument as claimed in claim 1, wherein said first housing includes a first jaw member and said second housing includes a second jaw member, one of the jaw members having a body part with a convex surface facing the other jaw member.

3. A test instrument as claimed in claim 2, wherein the jaw members are mounted to permit relative movement of the jaw members towards and away from each other as said second housing slides within said first housing whereby an optical fiber placed between the jaw members is constrained to adopt the curvature of said convex body part when the jaw members are moved towards each other.

4. A test instrument as claimed in claim 2, wherein said body part having the convex surface is a cylinder having a vee groove on its outer surface to accommodate said fiber.

5. A test instrument as claimed in claim 2, wherein the second jaw member has spaced resilient seating parts whereby to force the fiber to conform to a convex surface as the jaw members come together.

6. A test instrument as claimed in claim 2, wherein said first and second housing are spring mounted relative to one another, said first housing movable against a spring bias to move the first jaw member away from the second jaw member to permit the fiber to be positioned between the jaw members.

7. A test instrument as claimed in claim 2, wherein said detection means includes a lens to focus light scattered from the single bend in the fiber to a photodiode.

8. A test instrument as claimed in claim 7, wherein the jaw members are symmetrical about an optical axis extending through the lens and the center of the photodiode.

9. A test instrument as claimed in claim 1, wherein said generating means includes a level detector and a switch operable to direct current through the indicator circuit.

10. A test instrument as claimed in claim 1, wherein said indicator circuit includes at least one light emitting diode.

11. A test instrument as claimed in claim 2, wherein said second housing has a first compartment for said power supply means.

12. A test instrument as claimed in claim 11, wherein said second housing has a second compartment for electronic components of said generating means and said indicator circuit.

13. A Test Instrument as claimed in claim 12, wherein said second housing has a third compartment containing said detection means and the second jaw member, the third compartment being at least partially encompassed by said first housing.

14. A test instrument as claimed in claim 13, wherein the said second housing aperture is formed in said third compartment.

* * * * *